United States Patent [19]
Marotta et al.

[11] Patent Number: 5,874,849
[45] Date of Patent: Feb. 23, 1999

[54] LOW VOLTAGE, HIGH CURRENT PUMP FOR FLASH MEMORY

[75] Inventors: Giulio Marotta, Contigliano; Giovanni Santin, Santa Rufina; Pietro Piersimoni, Fabriano, all of Italy; Michael C. Smayling, Missouri City, Tex.

[73] Assignee: Texas Instruments Incorporated, Dallas, Tex.

[21] Appl. No.: 684,652

[22] Filed: Jul. 19, 1996

[51] Int. Cl.$^6$ .................................................. G05F 1/10
[52] U.S. Cl. ........................ 327/536; 363/60; 307/110
[58] Field of Search .............................. 327/536; 363/59, 363/60; 307/110

[56] References Cited

U.S. PATENT DOCUMENTS

| | | | |
|---|---|---|---|
| 4,583,157 | 4/1986 | Kirsch et al. | 363/60 |
| 4,656,369 | 4/1987 | Lou | 327/536 |
| 4,705,966 | 11/1987 | Van Zanten | 327/536 |
| 4,962,512 | 10/1990 | Kiuchi | 363/60 |
| 5,301,097 | 4/1994 | McDaniel | 363/60 |
| 5,530,640 | 6/1996 | Hara et al. | 363/60 |

*Primary Examiner*—Kenneth B. Wells
*Attorney, Agent, or Firm*—J. Dennis Moore; Richard L. Donaldson

[57] ABSTRACT

A charge pump 1 for operation in an integrated circuit having a power source Vdd. The pump is made of a plurality of pump cells 10 connected together. Each pump cell includes an inverter 50 having a port 42 to receive a negative bias input, a port 44 to receive a positive bias input, a port 38 to receive a clock input, and a port 40 to output an output clock signal at the same frequency of the clock input, but phase shifted by a predetermined amount determined by the signal levels of the negative bias and said positive bias. Also included in each pump cell is a capacitor 26. A circuit 20, 22, 24, for coupling the output clock signal to one port of the capacitor is also provided, as is a pair of diodes 28, 30, connected serially together, one end of the pair being connected to the power source and the other end 48 of the pair providing the output signal of the pump cell, the common point of the pair being connected to the other port of the capacitor. The pump cells are connected together such that the inverters are connected together to form a ring oscillator and such that the output signals are connected in parallel. The pump provides a stable source of high current at a moderately boosted voltage, with very low ripple, and is suitable for use with non-volatile, programmable memories.

1 Claim, 2 Drawing Sheets

LOW VOLTAGE, HIGH CURRENT PUMP FOR FLASH MEMORY

TECHNICAL FIELD OF THE INVENTION

This invention relates to integrated circuit non-volatile, programmable memory, such as FLASH memory, and more particularly relates to a high current charge pump with mixed bipolar and CMOS transistors for use in single-voltage-supply memories of this type.

BACKGROUND OF THE INVENTION

Presently, in certain non-volatile, programmable memories, such as FLASH memories, program operation is done by channel hot electron injection. This requires that a relatively high current be available from the power supply, typically 1 mA for a single memory cell. In dual power supply memories this current is available from a higher voltage power supply, sometimes referred to as Vpp. However, the provision of an external high current supply is not suitable for many applications.

Internal current supplies based on a single voltage power supply, for example provided at, 5 V, such single voltage sometimes being referred to as Vdd, have been provided in the prior art. However, these supplies must provide stable performance over the entire Vdd and temperature range, and this has led to problems. State of the art charge pumps of this type are able to generate a voltage in the range of 6 V and a current in the range of 10 mA, using voltage doublers with n-channel MOS transistors as rectifying elements. A problem with these circuits is that the voltage drop across the MOS devices due to transistor Vt and body effect at these current levels creates undesirable power dissipation. To overcome these undesirable effects, more complicated circuits have been devised to bootstrap the gate of the rectifying elements, increasing the component count and circuit complexity.

Accordingly, it is desired to have an internal charge pump that provides high current, efficiently, at moderate voltages. Further, it is desired to have such a charge pump that is stable in the whole Vdd and temperature range in which the memory is expected to operate. The present invention provides such a charge pump.

SUMMARY OF THE INVENTION

According to the present invention, there is provided a charge pump for operation in an integrated circuit having a power source. The pump is made of a plurality of pump cells connected together. Each pump cell includes an inverter having a port to receive a negative bias input, a port to receive a positive bias input, a port to receive a clock input, and a port to output an output clock signal at the same frequency of the clock input, but phase shifted by a predetermined amount determined by the signal levels of the negative bias and said positive bias. Also included in each pump cell is a capacitor. A circuit for coupling the output clock signal to one port of the capacitor is also provided, as is a pair of diodes, connected serially together, one end of the pair being connected to the power source and the other end of the pair providing the output signal of the pump cell, the common point of the pair being connected to the other port of the capacitor. The pump cells are connected together such that the inverters are connected together to form a ring oscillator and such that the output signals are connected in parallel. The pump provides a stable source of high current at a moderately boosted voltage, with very low ripple, and is suitable for use with non-volatile, programmable memories.

These and other features of the invention that will be apparent to those skilled in the art from the following detailed description of the invention, taken together with the accompanying drawings.

DETAILED DESCRIPTION OF THE INVENTION

Figure 1:
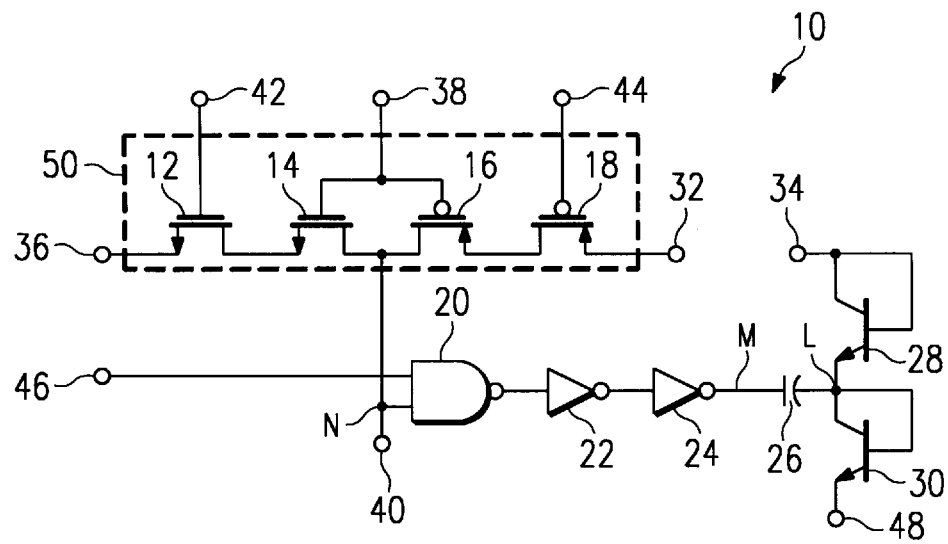
FIG. 1 is a schematic diagram of one stage of the charge pump of the preferred embodiment of the present invention.
Figure 2:
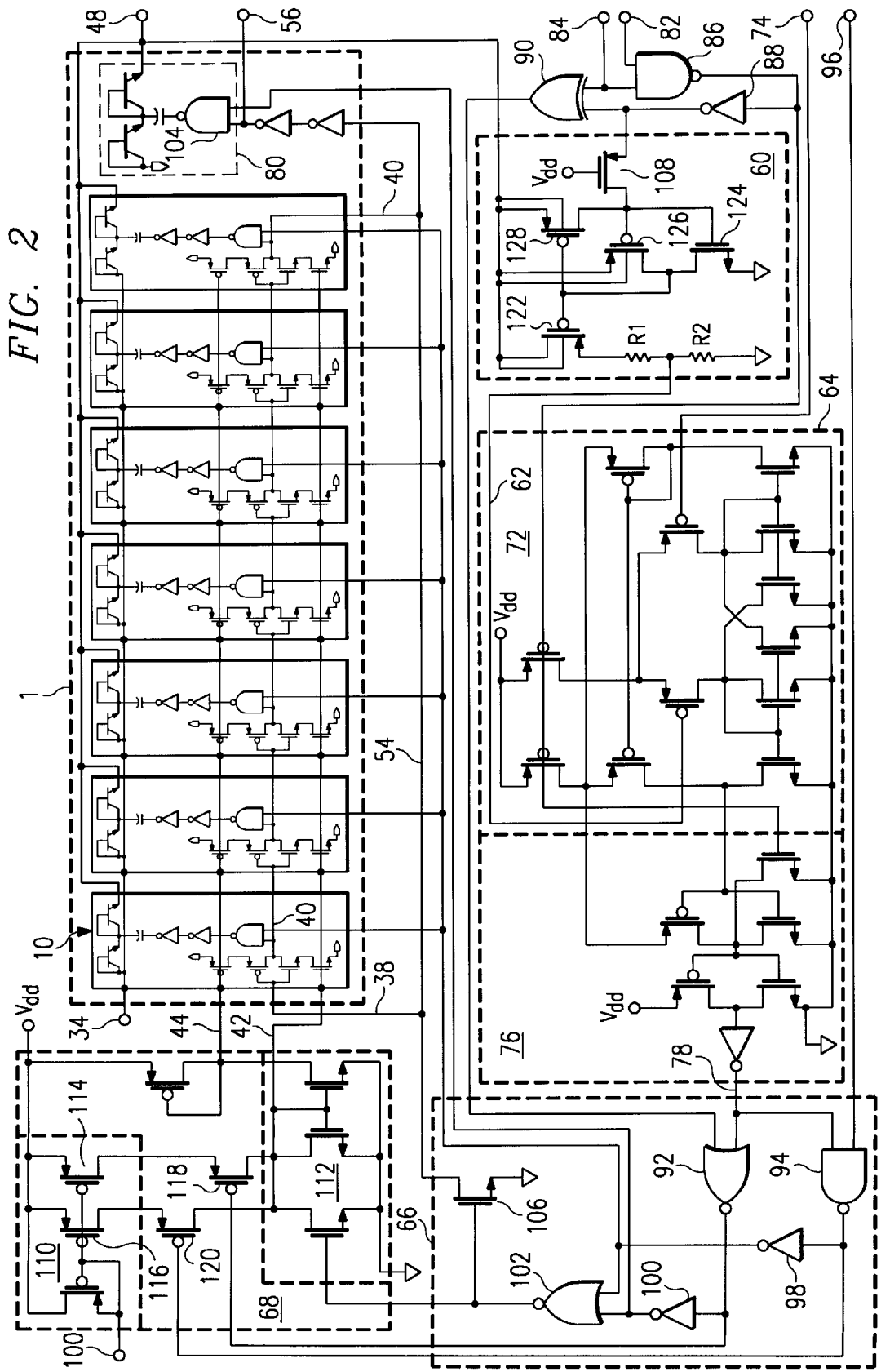
FIG. 2 is a schematic diagram of the complete charge pump of the preferred embodiment of the present invention.

The circuit of a single charge pump stage, or cell 10, of the of the preferred embodiment of the present invention is shown in FIG. 1. As shown in FIG. 2, the charge pump cell 10 is utilized with six other such charge pump cells 10 in the preferred embodiment to form a seven stage charge pump 1. It will be understood that the number of stages in a given embodiment of the invention is a matter of design choice, well within the purview of one of ordinary skill in the art, once the principles of the present invention, as set forth herein, are understood. In implementations involving a ring oscillator structure such as shown in FIG. 2, however, it is considered preferred to utilize an odd number of stages, since the ring oscillator is integral with the charge pump and requires an odd number of stages.

Returning now to FIG. 1, the pump cell circuit 10 is comprised of two n-channel field effect transistor (FET) devices 12, 14, connected source to drain, as shown, with the gate of device 12 being connected to port 42, and two p-channel FET devices 16, 18, connected source to drain, as shown, with the gate of device 18 being connected to port 44, and the gates of devices 14 and 16 being connected together and to port 38. A two input NAND gate 20 is also provided, having one input connected to node N which is also the interconnection point of the drains of devices 14 and 16, respectively, and having the other input thereof connected to port 46. Two inverters 22, 24, are connected in series to the output of NAND gate 20, and a capacitor 26, of for example 50 pF, is connected to the output of inverter 24 at node M. Two npn-type bipolar transistors 28, 30, are wired as diodes by the interconnection of their collector and base, and joined together, the anode of the diode formed by device 28 being connected to port 34 and the cathode of the diode formed by device 30 being connected to port 48, the anode of the diode formed by device 30 and the cathode of the diode formed by device 28 being connected to capacitor 26 at node L. Supply voltage, Vdd, is supplied to ports 32 and 34, while port 36 is connected to ground. A ring oscillator clock signal, CLKIN, is supplied to port 38, and an output clock signal, CLKOUT, inverted and slightly delayed from CLKIN, is provided on port 40, which is also identified as node N, for the next stage in the ring. A first bias signal, BIASN, is supplied to port 42 and a second bias signal, BIASP, is supplied to port 44. An enable signal, EN, is provided on port 46, while the output, VOUTn, is provided on port 48.

In operation, capacitor 26 is driven by a square wave clock on node M, derived from a ring oscillator signal on node N and buffered through NAND gate 20 and the two inverters 22, 24. When node M is at zero volts, the capacitor 26 is charged to Vdd minus the base-emitter drop, Vbe, across transistor 28, which is wired as a diode to minimize the base resistance. When node M switches to Vdd level, node L is boosted to Vdd+Vdd−Vbe. The base-emitter junction of transistor 28 is then reverse biased, and the output is provided on node 48 at a theoretical maximum of 2×(Vdd−Vbe) through transistor 30. The actual output will, in practice, be something less due to loading effects.

It will be noted that the NAND gate 20 allows for switching the pump cell off to save power between programming cycles by holding the EN signal on port 46 low, as well as acting as an on-off regulator for the pump formed by capacitor 26 and transistors 28 and 30.

As mentioned above, the pump cell 10 can be utilized with other such stages in a ring oscillator configuration. Specifically, FET devices 12, 14, 16 and 18, are connected, as shown in FIG. 1, as a current controlled inverter 50 that can form part of a frequency controlled ring oscillator. This can be seen more clearly in FIG. 2, wherein seven stages, each comprising a pump cell 10, are interconnected. The inputs 38 and outputs 40 of the current inverters 50 are connected one to the next, and via feedback path 54, in a ring oscillator. The ring oscillator signal can be monitored on port 56. The outputs 48 of the pump cells 10 are connected in parallel, as shown.

The pump works as a multiphase system, so that at any given instant, as the ring oscillator passes clock signals CLKIN at port 38 to CLKOUT at port 40 of each cell 10 along the ring, with the clock pulses of each cell 10 at node M thereof driving the output contribution, VOUTn, of each cell 10 to the output port 48, there is at least one pump cell 10 in the process of delivering electrical charge to the output port 48 (FIG. 2) at any given time while the ring is operating. The charge pump 1 described herein can generate high current, 10 mA, at greater than 6 V.

Other circuit elements in FIG. 2 will now be described. Several major functional blocks can be seen in FIG. 2. A buffer and voltage divider block 60 buffers and monitors the voltage on output port 48 and provides an output signal on line 62 proportional to such voltage. This output signal on line 62 is provided to a differential amplifier/buffer block 64 comprising a differential amplifier 72 and a buffer 76. Amplifier/buffer block 64 provides a control signal to an enable control block 66. The enable control block 66 provides control signals to a ring oscillator control block 68 and to the charge pump 1.

Generally, the buffer and voltage divider block 60 buffers and monitors the voltage on output port 48, and divides it down through resistors R1 and R2 to provide a control signal on line 62 to the differential amplifier/buffer block 64. There, a differential amplifier 72 compares the voltage on line 62 to a reference voltage provided on port 74. The voltage on port 74 can be, e.g., provided from a band-gap reference source. Depending on whether the voltage on line 62 is greater than or less than the voltage on port 74, either a "1" or a "0" will be generated as an output of the differential amplifier 72, and buffered and inverted by buffer 76 before being provided as an output of the differential amplifier/buffer block 64 on line 78 to the enable control block 66.

The enable control block 66 monitors various enable signals, and depending on the state of such enable signals: a) disables the ring oscillator control block 68 and the ring oscillator to minimize power dissipation when the function of the charge pump 1 is not needed, b) blocks the ring oscillator clock (using NAND gate 20; FIG. 1) from the charge pumps to stop further charge pumping in the charge pump 1 during regulation thereof, or c) enables a supplemental charge pump 80. This supplemental charge pump 80 can be used alone (i.e., the seven pump cells 10 being disabled) during a read mode of an array (not shown) with which the charge pump 1 is used, during which a low current bias is required for a row decoder, at, for example, 8 V.

The ring oscillator control block 68 has a 5 mA current source applied to it on port 100. Ring oscillator control block 68 also includes a first current mirror 110 and a second current mirror 112. The first current mirror 110 generates 5 mA through a 4 micron wide p-channel FET 114, mirroring on a 1:1 basis the current supplied on port 100. The first current mirror 110 also generates 100 mA through an 80 micron wide p-channel FET 116, mirroring on a 20:1 basis the current supplied on port 100. The 5 mA current generated by the first current mirror 110 is supplied to input line 42 to the charge pump 1 through FET 118, which acts as a switch, while the 100 mA current generated by the first current mirror 110 also flows through loads internal to block 68, resulting in a second ring control voltage, higher than the first ring control voltage, that is supplied to input line 42 to the charge pump 1 through FET 120, which acts as a switch.

The second current mirror 112 mirrors either the 5 mA or the 100 mA on line 42 (depending on whether the high current has been switched on through FET device 120), and provides the resulting first ring control voltage or second ring control voltage from the mirrored current of 5 mA or 100 mA, respectively, to line 44. Providing, alternatively, the first ring control voltage or second ring control voltage on lines 42 and 44 controls the ring oscillator in charge pump 1 to oscillate at a low frequency or a high frequency, respectively. The relative equivelence of voltage levels on lines 42 and 44 assures a relatively symmetrical ring oscillator waveform which, in turn, assures a relatively low ripple output on port 48.

A more detailed description of the control operations of the circuit of FIG. 2 will now be given. A regulate enable signal is provided on port 82, while a master pump enable signal is provided on port 84. The regulate enable signal provided on port 82 enables blocks 60 and 64 for regulation of the voltage on port 48 in high current mode. The master pump enable signal provided on port 84 enables the charge pump 1.

These signals on ports 82 and 84 are provided to the inputs of a NAND gate 86. The output of NAND gate 86 is provided to an enable input of the differential amplifier/buffer block 64, and, through an inverter 88 to an enable input of the voltage divider block 60. The output of inverter 88 is also provided to one input of an exclusive OR gate 90, the other input of which is connected to port 84. The output of exclusive OR gate 90 is provided to one input of a NOR gate 92, the other input of NOR gate 92 being the output 78 of the differential amplifier/buffer block 64. The output 78 is also provided to one input of a two input NAND gate 94. A "high current", i.e., write, enable signal is provided on input port 96, which is provided to the other input of NAND gate 94.

The output of NAND gate 94 is provided to the input of an inverter 98 and to the control gate of FET 120 in ring oscillator control block 68. The output of NOR gate 92 is provided to the input of an inverter 100 and to the control gate of FET 118 in ring oscillator control block 68. The output of inverter 100 is provided to one input of a NOR gate 102 and to one input of the NAND gate 104 of the supplemental charge pump 80. The output of inverter 98 is provided to the other input of NOR gate 102 as well as to the inputs of the NAND gates 20 (FIG. 1) of each cell 10 of the charge pump 1 (FIG. 2). The output of NOR gate 102 is provided to the gate of an n-channel FET device 106 and to the control gate of an n-channel FET 113 in ring oscillator control block 68. The source of the p-channel FET device 106 is connected to ground, while its drain is connected to the ring oscillator feedback line 54. The drain of FET 113 is connected to line 42, while its source is connected to ground.

Referring now in detail to the control operations, with master pump enable signal port 84 inactive, i.e., low, the voltage divider block 60 is disabled, as are the differential amplifier/buffer block 64, the ring oscillator control block 68 and the charge pump 1. This is accomplished as follows. With port 84 low the output of NAND gate 86 is forced high. This forces the output inverter 88 low, turning on device 108. This turns on device 126 which causes device 122 to turn off, disabling the voltage divider RI, R2. The output of exclusive OR gate 90 is also forced low.

With the output of NAND gate 86 high, devices 71 and 73 are turned off, disabling block 64, forcing the output line 78 low. With line 78 and the output of exclusive OR gate 90 both low, the output of NOR gate 92 is forced high, turning off device 118. Also, with line 78 low the output of NAND gate 94 is forced high, turning off device 120. With the outputs of NOR gate 92 and NAND gate 94 high the output of NOR gate 102 is forced high, turning on device 113 and turning on device 106. With devices 118 and 120 off, and device 113 on ring oscillator control block 68 is effectively disabled, turning off the ring oscillator. With device 106 on, the ring oscillator feedback line 54 is effectively grounded, assuring that the ring oscillator is disabled, even if residual leakage current would otherwise drive it with block 68 disabled as previously described. Finally, with the output of NAND gate 94 high, the output of inverter 98 is low, disabling NAND gates 20 of the pump cells 10 (FIGS. 1, 2), turning off the charge pump 1.

With mask pump enable port 84 high, the pump is enabled. With regulator enable port 82 and high current enable port 96 both low, the output of NAND gate 86 is still high, disabling blocks 60 and 64. However the output of exclusive OR gate 90 is high turning off devices 106 and 113 and turning on device 118. However, the output of inverter 98 is low. Thus, the ring oscillator and charge pump 1 are on, but pump cells 10 are disabled, with only supplemental cell 80 enabled, i.e., in low current mode and unregulated.

With port 84 high and port 82 high but port 96 low, the output of exclusion OR gate 90 is forced low, as is the output of NAND gate 86. Thus, blocks 60 and 64 are enabled, enabling regulation, with the output of exclusive OR gate 90 being low, thus allowing the ON/OFF regulation signals on line 78 to pass through NOR gate 92. However with port 96 low, once again even though block 68 is enabled, nonetheless only supplemental cell 80 is enabled in the charge pump, i.e., in low current mode.

Driving port 96 high frees NAND gate 94 to pass the "ON" regulation signals on line 78 to device 120, enabling high current, i.e., high frequency operation of the ring oscillator, while allowing the output of inverter 98 to go high during regulation "ON", enabling pump cells 10, i.e., high current mode.

Note that devices 108, 124, 126 and 128 comprise a standard level shifter, employed to assure turn-off of device 122 when block 60 is disabled.

When block 64 is enabled, regulation is accomplished as follows. The voltage on line 62 from voltage divider R1/R2 is compared in differential amplifier 72 with the reference voltage on port 74. If the voltage on line 62 is higher than the reference voltage the differential amplifier 72 produces a high output on line 75. This signal is inverted three times in buffer 76, appearing as a low signal on line 78. When the voltage on line 62 is lower than the reference signal, the inverse occurs.

Figure 3:
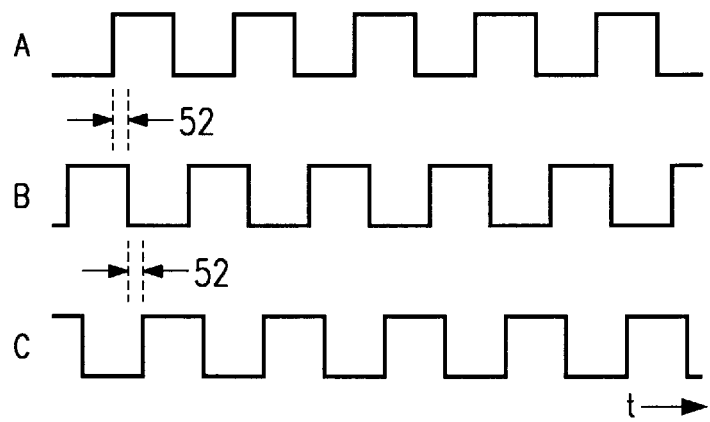
FIG. 3 is a diagram of the output signals of three successive stages of the charge pump of the preferred embodiment of the present invention.

FIG. 3 is a diagram showing the output signals A, B, C, of three successive stages 10 of the charge pump 1, with time represented on the horizontal axis and signal level on the vertical axis, aligned vertically to show their relative phase difference. As can be seen, each successive output signal is 180° out of phase with the output of the preceding stage, plus a small offset 52, as shown. This results in a very low ripple on the output signal of the charge pump 1, as the generally sawtooth output of each stage 10 is superimposed on one another on line 48, slightly offset in time from one another.

Note that, advantageously, no external clock is needed. In addition, the frequency of the ring oscillator can be controlled by the two bias signals, on lines 42 and 44, to allow voltage regulation.

Although the present invention and its advantages have been described in detail, it should be understood that various changes substitutions and alterations can be made herein without departing from the spirit and scope of the invention as defined by the appended claims.

What is claimed is:

1. A charge pump for operation in an integrated circuit having a power supply node providing a predetermined polarity voltage with respect to an electrical ground node, comprising a plurality of pump cells, each pump cell comprising:

a logical inverter having a first polarity power connection and having a second polarity power connection, configured to receive a clock input, and to provide an output clock signal that is inverted with respect to said clock input;

a first FET having a source and a drain connected between said first polarity power connection and said ground node, and having a gate receiving a first bias input;

a second FET having a source and a drain connected between said second polarity power connection and said power supply node, and having a gate receiving a second bias input;

a logic gate having a first input receiving said clock output, having a second input receiving a control signal, and having an output port, a capacitor having a first port and a second port;

a buffer circuit for coupling said output port of said gate to said first port of said capacitor; and a pair of diodes, each of said diodes comprising a bipolar transistor wired so as to include a short circuit between its base and collector so as to operate as a diode, said pair of diodes being connected serially together, one end of said pair being connected to said power supply node, and the other end of said pair being an output node for said pump cell and providing the output signal of said pump cell, the common point of said pair being connected to said second port of said capacitor;

said logical inverters being connected together to form a ring oscillator such that said output nodes are connected together, and such that said ring oscillator is connectable to each of said buffer circuits by assertion of said control signal.

* * * * *